(12) United States Patent
Shiono

(10) Patent No.: US 8,593,662 B2
(45) Date of Patent: Nov. 26, 2013

(54) COMPOUND IMAGE-FORMING METHOD AND COMPOUND IMAGE-FORMING APPARATUS

(75) Inventor: Kouichi Shiono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1260 days.

(21) Appl. No.: 11/821,015

(22) Filed: Jun. 20, 2007

(65) Prior Publication Data

US 2008/0002241 A1    Jan. 3, 2008

(30) Foreign Application Priority Data

Jun. 29, 2006   (JP) ................. 2006-180376

(51) Int. Cl.
*H04N 1/04* (2006.01)
*G06K 9/36* (2006.01)

(52) U.S. Cl.
USPC ........ 358/1.15; 358/1.16; 358/1.17; 382/173; 382/232

(58) Field of Classification Search
USPC .................... 358/1.15–1.17; 382/173, 232
See application file for complete search history.

(56) References Cited

U.S. PATENT DOCUMENTS

| | | | | |
|---|---|---|---|---|
| 5,771,340 | A * | 6/1998 | Nakazato et al. | 358/1.15 |
| 5,969,828 | A * | 10/1999 | Kawasaki et al. | 382/235 |
| 6,369,910 | B1 * | 4/2002 | Mitani | 358/1.17 |
| 6,456,390 | B1 * | 9/2002 | Okubo et al. | 358/1.17 |
| 6,801,333 | B1 * | 10/2004 | Weiss | 358/1.15 |
| 7,653,800 | B2 * | 1/2010 | Zohar et al. | 711/173 |
| 2004/0105114 | A1 * | 6/2004 | Tomomatsu | 358/1.13 |
| 2004/0167971 | A1 * | 8/2004 | Manolis et al. | 709/217 |
| 2004/0207654 | A1 * | 10/2004 | Hasuike | 345/698 |
| 2005/0219595 | A1 * | 10/2005 | Kidani | 358/1.13 |
| 2006/0045466 | A1 * | 3/2006 | Sasaki et al. | 386/52 |

FOREIGN PATENT DOCUMENTS

| | | |
|---|---|---|
| JP | 8-116525 | 5/1996 |
| JP | 9-36749 | 2/1997 |
| JP | 11-341241 | 12/1999 |
| JP | 2004-48148 | 2/2004 |
| JP | 2004-349858 | 12/2004 |
| JP | 2005-223702 | 8/2005 |
| JP | 2005-244616 | 9/2005 |
| JP | 2006-27055 | 2/2006 |
| JP | 2006-33568 | 2/2006 |

OTHER PUBLICATIONS

Dec. 14, 2010 Japanese official action in connection with a counterpart Japanese patent application.

* cited by examiner

*Primary Examiner* — Peter K Huntsinger
(74) *Attorney, Agent, or Firm* — Cooper & Dunham LLP

(57) ABSTRACT

A compound image-forming method and compound image-forming apparatus capable of handling image formation without prolonging processing time even if the compression system is not able to carry out partial decoding of a compressed image. The present invention reads a document, partitions a one-page image into an arbitrary number of units at the same time while the document is being read, and compresses the partitioned image, thereby making it possible to use a common image, and, in a copying operation, enabling printing without waiting for an entire page to be read, thus making it possible to enhance printing performance capabilities for fast printing and others. Further, in a facsimile transmission, transmission can be carried out without waiting for an entire page to be read, thereby enabling communication time to be reduced.

15 Claims, 11 Drawing Sheets

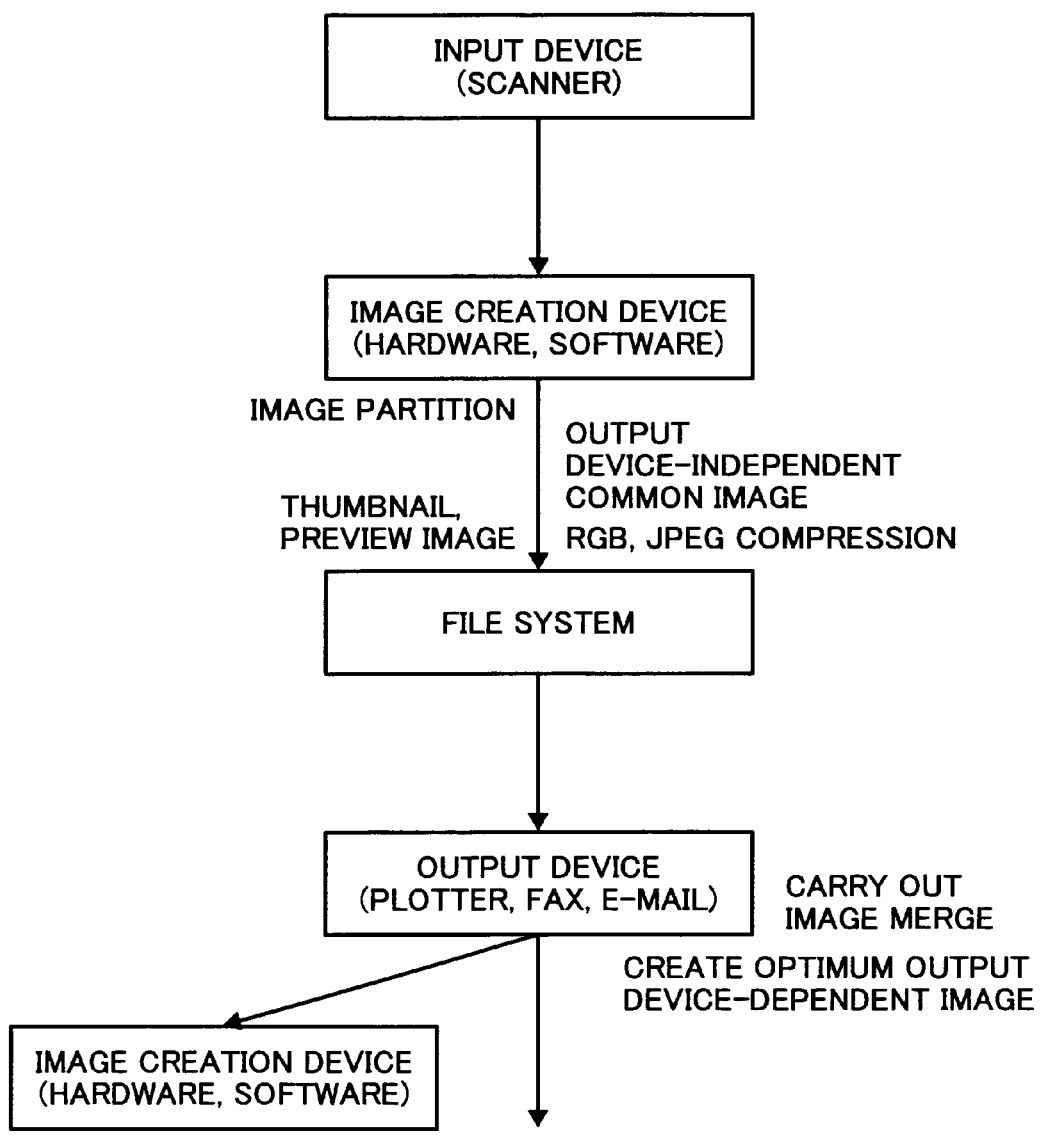

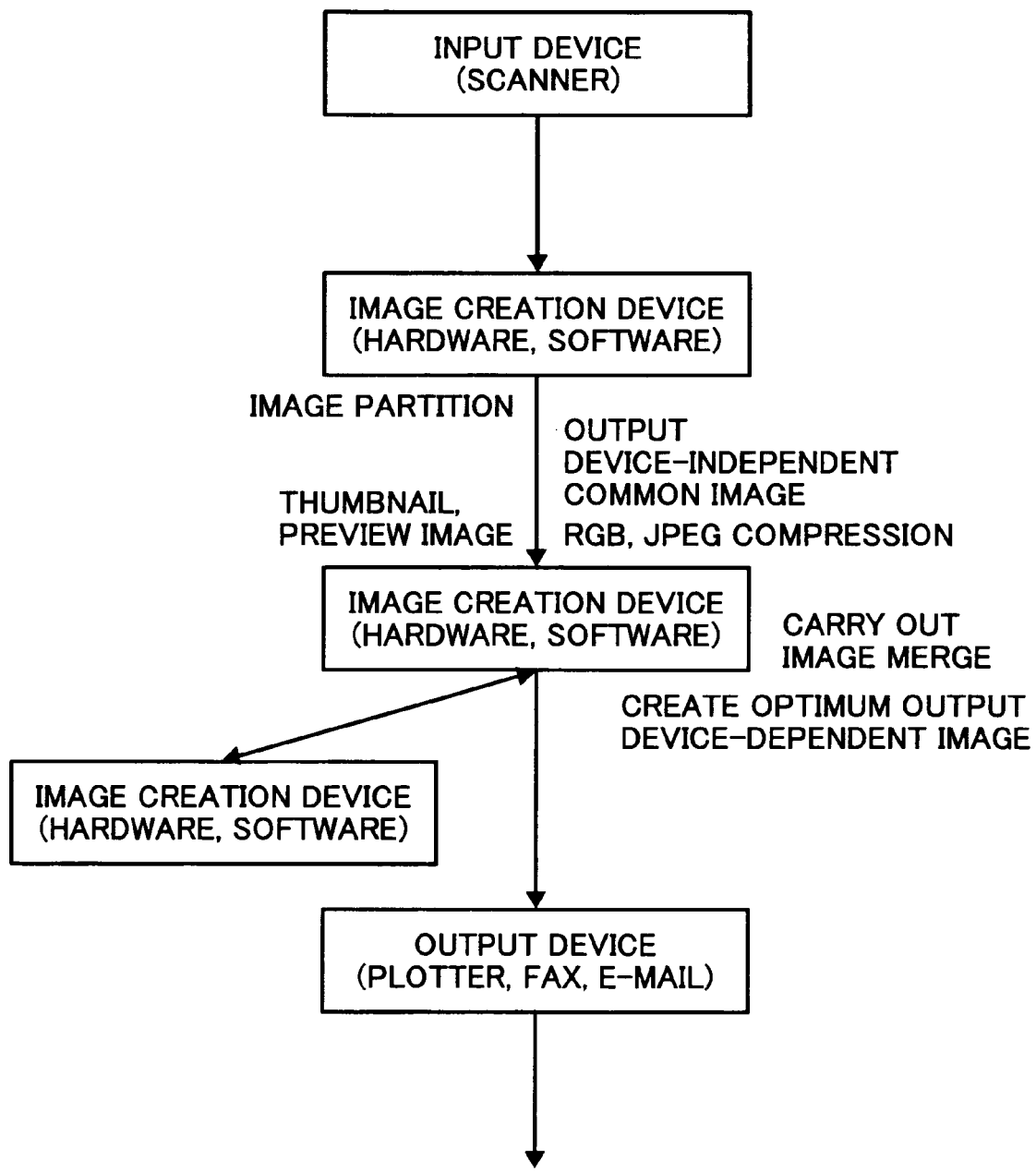

COMPOUND IMAGE-FORMING METHOD AND COMPOUND IMAGE-FORMING APPARATUS

BACKGROUND OF THE INVENTION

1. Field of the Invention

The present invention relates to a compound image-forming method and compound image-forming apparatus having another application besides a facsimile application.

2. Description of the Background Art

Together with the widespread use of digital copiers in recent years, there has been proposed a compound copier (also called a multifunctional peripheral or MFP), which has a facsimile function in addition to a copying function. An MFP has functions for processing an input operation and an output operation in parallel, such as a copying function for reading and printing a document, and a facsimile function and e-mail transmission function for reading and sending a document. Recently, MFPs have been equipped with functions that enable a plurality of output operations to be selected relative to an input. For example, there are functions for sending a facsimile, carrying out a printing operation to obtain a duplicate cope, and storing information in an HDD (hard disk drive) via a one-scan operation. For this reason, it is common to perform reading using the imaging format and formatting format that is the easiest to handle by the various types of functions. JPEG can be cited as typical example of this for color images, and MMR can be cited as a typical example of this for black-and-white images.

Since color is emphasized in MFPs, JPEG will be explained hereinbelow.

For example, problems arise with the copy function and facsimile function of an MFP, which has hardware for using JPEG to compress an image read using an RGB format.

<Copy Function>

Since it is not possible to carry out compression or decompression with JPEG until the reading of an entire page is complete, it is difficult to achieve fast copying speed or to speed up the time between pages. This is especially noticeable with a long document.

<Facsimile Function>

Since it is not possible to carry out compression or decompression with JPEG until the reading of an entire page is complete, the start of transmission for the top page is delayed, and communication delays occur between pages. This is especially noticeable for long documents. In a worst case scenario, communications are cutoff.

Furthermore, in recent years, for security and resource conservation reasons, it has become the practice to display and check an original image on the operation panel prior to printout or transmission, carrying out the output operation thereafter. Further, image data is transferred to a server where it undergoes historical management. Preview and thumbnail images are created for this purpose. Furthermore, since there are no time restrictions for creating a preview or thumbnail image, users generally like to create an image file using a one-page format.

However, when copying or faxing a long document, outputting after reading has been completed takes time. Accordingly, Japanese Patent Laid-open No. 8-116525, for example, proposed dividing output times to coincide with the size of the printing paper.

However, the problem with this prior art is that processing takes a long time when the compression system is not able to partially decode a compressed image.

Technologies related to the present invention are also disclosed in other Japanese Patents, e.g., 2004-048148, 2004-349858, 2005-223702, 2005-244616, H09-036749 and H11-341241.

SUMMARY OF THE INVENTION

Accordingly, an object of the present invention is to provide a compound image-forming method and compound image-forming apparatus capable of handling image formation without prolonging processing time even if the compression system is not able to carry out partial decoding of a compressed image.

In an aspect of the present invention, a compound image-forming method comprises the steps of: reading a document; partitioning a one-page image into an arbitrary number of units while as the document is being read; and compressing a partitioned image.

In another aspect of the present invention, a compound image-forming method comprises the steps of: reading by partitioned area unit; writing by partitioned area unit; and configuring a one-page image using all partitioned units.

In another aspect of the present invention, a compound image-forming method comprises the steps of: inputting a document; executing and concealing partitioning of an inputted image using a file system; and handling the image as a continuous image for an input/output device.

In another aspect of the present invention, a compound image-forming method comprises a step of creating a pre-output preview image or thumbnail image without carrying out page partitioning.

In another aspect of the present invention, a compound image-forming method comprises a step of associatively managing a non-partitioned preview image or thumbnail image, and a partitioned original image.

In another aspect of the present invention, a compound image-forming method comprises the steps of: enabling to select whether or not a preview image or thumbnail image is subjected to page partitioning; and carrying out file management.

In another aspect of the present invention, a compound image-forming apparatus comprises a main controller, which sets the number of partition reference lines, creates a partition descriptor in RAM, sets a partition descriptor head address, and carries out a read instruction to a scanner controller for an image creation device controller; and an image creation device controller, which carries out JPEG compression for only a set number of lines worth of an inputted image, and outputs the JPEG-compressed data to an output destination address written in the partition descriptor.

In another aspect of the present invention, a compound image-forming apparatus comprises a scanner controller; a file manager; and an image creation device, which prepares file information communicated from the scanner controller as document management information for the file manager, prepares page information communicated from the scanner controller as page management information for the file manager, prepares the number of partitions and addresses communicated from the scanner controller as partition management information for the file manager, and prepares write-band address information communicated from the scanner controller as band information for the file manager.

In another aspect of the present invention, a compound image-forming apparatus comprises a file manager; and an output device, which references document management information for the file manager, references page information as page management information for the file manager, references a number of partitions and addresses as partition management information for the file manager, references band address information as band information for the file manager, inputs the information to an image creation device, specifies the optimum compression format and resolution for the output device itself, and starts outputting.

In another aspect of the present invention, a compound image-forming apparatus comprises an image creation device; an output device, which references document management information for a file manager, references page information as page management information for the file manager, references band address information as band information for the file manager, and requests the optimum compression format and resolution for the output device itself from a file system; a file manager, which references the number of partitions and addresses as partition management information for the file manager itself; and a file system, which inputs page, partition and band information to the image creation device, inputs the optimum compression format and resolution specified by the output device to the image creation device, and starts outputting.

In another aspect of the present invention, a compound image-forming apparatus comprises a file manager; a scanner controller; and an image creation device, which, based on an original image file ID delivered from the file manager, carries out a document opening process for the file manager, carries out a page opening process for the file manager, and prepares write band address information communicated from the scanner controller as band information for the file manager.

In another aspect of the present invention, a compound image-forming apparatus comprises a scanner controller; a file manager; and an image creation device, which, based on an original image file ID delivered from the file manager, carries out a document opening process for the file manager, carries out a page opening process for the file manager, creates thumbnail image information for the file manager, creates partition management information for the file manager, and prepares write band address information communicated from the scanner controller as band information for the file manager.

In another aspect of the present invention, a compound image-forming apparatus comprises a scanner controller; a file manager; and an image creation device, which, based on an original image file ID delivered from the file manager, carries out a document opening process for the file manager, carries out a page opening process for the file manager, creates thumbnail image information for the file manager, partitions a thumbnail image and preview image, creates partition management information for the file manager, and prepares write band address information communicated from the scanner controller as band information for the file manager.

BRIEF DESCRIPTION OF THE DRAWINGS

The above and other objects, features and advantages of the present invention will become more apparent from the following detailed description taken with the accompanying drawings in which:

FIG. 5 is a schematic diagram of embodiment 3 of the compound image-forming method related to the present invention;

FIG. 6 is a schematic diagram of embodiment 4 of the compound image-forming method related to the present invention;

DESCRIPTION OF THE PREFERRED EMBODIMENTS

Figure 1:
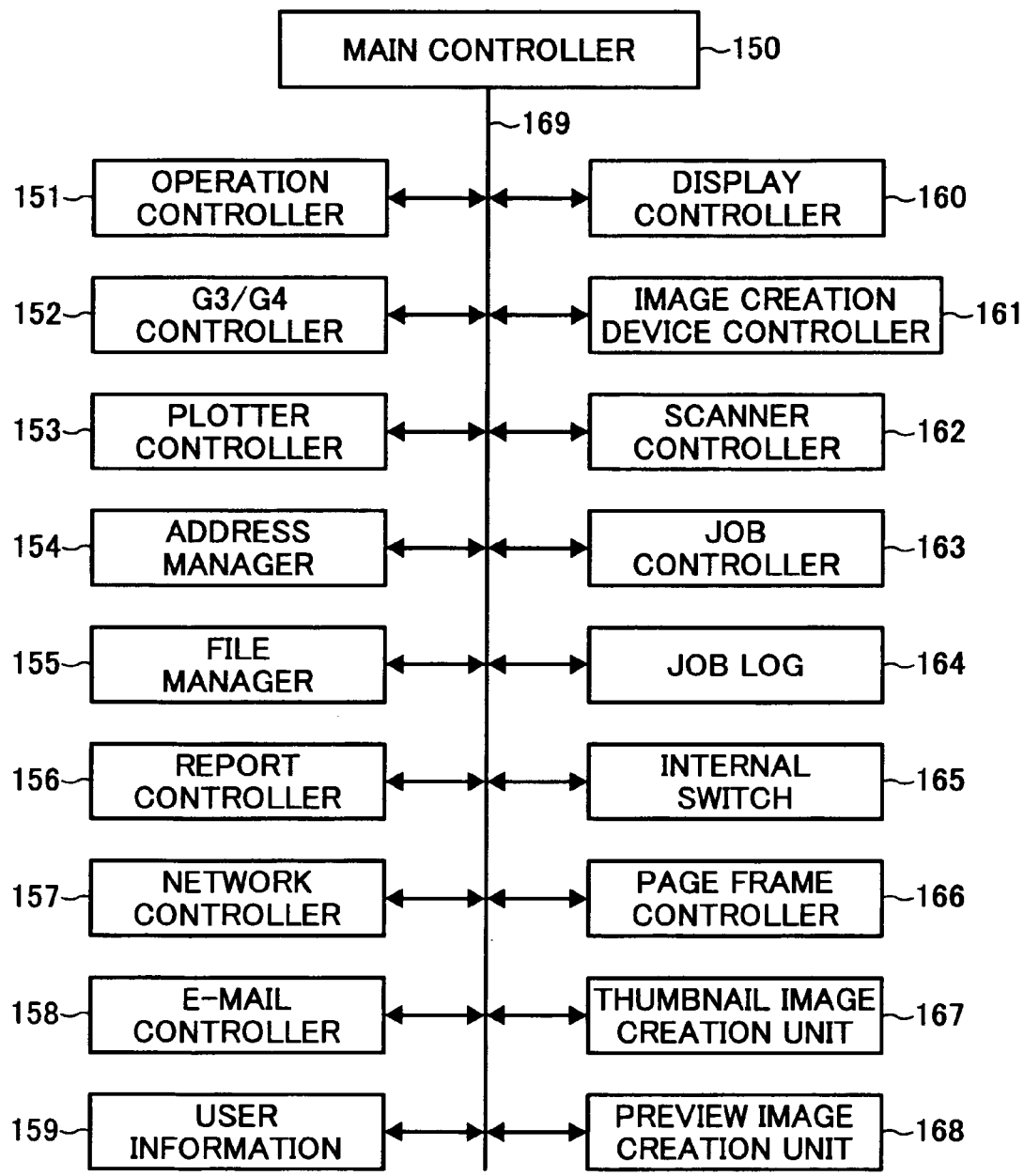
FIG. 1 is a block diagram showing embodiment 1 of a compound image-forming apparatus, which applies the compound image-forming method of the present invention.

Prior to explaining the respective embodiments of the present invention, the characteristic features of the present invention will be enumerated hereinbelow.

(1) Hardware, which carries out JPEG compression while partitioning a page into certain units, has been proposed in the past, but the present invention relates to software for carrying out this control. In addition, the present invention can parallelly create an image for a preview or thumbnail, and generally creates an image file in an easy-to-handle, non-partitioned format. An embodiment of a compound image-forming method related to the present invention is characterized by reading a document, partitioning a one-page image into an arbitrary number of units at the same time as reading the document, and compressing the partitioned image. Therefore, since this method can make use of a common image, and, in a copying operation, enables printing without waiting for an entire page to be read, fast printing and other such printing performance capabilities can be enhanced. Further, for a facsimile transmission, since it is possible to transmit without waiting for an entire page to be read, communication time can be reduced. This effect is particularly noticeable with long documents.

(2) Another embodiment of the compound image-forming method of the present invention is characterized by reading in accordance with partitioned area units, writing in accordance with partitioned area units, and making a one-page image using an entire partitioned area. Therefore, installing a file system, which is capable of managing a partition, makes it possible to mount an operable input/output device in an MFP without being consciously aware of the characteristics of a one-page image. As a result, effects, which enable the reuse of a past input/output device resource, and which eliminate the need to take into account image characteristics even when creating a new image, can be obtained.

(3) Another embodiment of the compound image-forming method of the present invention, in addition to the above-mentioned constitution, is characterized by partitioning a one-page image into arbitrary units, compressing the partitioned image, and outputting the compressed image by handling it as one continuous image. Therefore, installing a file system, which is capable of managing a partition, makes it possible to mount an operable input/output device in an MFP without being consciously aware of the characteristics of a one-page image. As a result, effects, which enable the reuse of a past input/output device resource, and which eliminate the need to take into account image characteristics even when creating a new image, can be obtained.

(4) Another embodiment of the compound image-forming method of the present invention is characterized by inputting a document, executing and concealing the partitioning of the inputted image with the file system, and handling the inputted image as a continuous image relative to the input/output device. Therefore, installing a file system, which is capable of managing a partition, makes it possible to mount an operable input/output device in an MFP without being consciously aware of the characteristics of a one-page image. As a result, effects, which enable the reuse of a past input/output device resource, and which eliminate the need to take into account image characteristics even when creating a new image, can be obtained.

(5) Another embodiment of the compound image-forming method of the present invention is characterized by creating a pre-output preview image or thumbnail image without partitioning the page. Therefore, the pre-output preview image or thumbnail image can be created in a general format, making it easier to reuse. Further, it is also easier to handle a file when it is transferred outside of the MFP.

(6) Another embodiment of the compound image-forming method of the present invention is characterized by associatively managing a non-partitioned preview image or thumbnail image together with a partitioned original image. Therefore, the pre-output preview image or thumbnail image can be created in a general format, making it easier to reuse. Further, it is also easier to handle a file when it is transferred outside of the MFP.

(7) Another embodiment of the compound image-forming method of the present invention is characterized by making it possible to select whether or not page partitioning will be carried out for a preview image or a thumbnail image, and by carrying out file management. Therefore, since it is also possible to subject a pre-output preview image or thumbnail image to page partitioning, partitioning a preview image or thumbnail image within a scope displayable on a screen makes it possible to link the image in partitioned units when scrolling. Consequently, it becomes possible to reduce the amount of memory for creating a page.

(8) An embodiment of a compound image-forming apparatus related to the present invention comprises a main controller, which sets a number of partition reference lines for an image creation device controller, creates a partition descriptor in RAM, sets a partition descriptor head address, and gives read instructions to a scanner controller; and an image creation device controller, which inputs only the set number of lines, carries out JPEG compression for an image, and outputs the JPEG-compressed image to an output destination address written in the partition descriptor. Therefore, since this apparatus can make use of a common image, and, in a copying operation, enables printing without waiting for an entire page to be read, fast printing and other such printing performance capabilities can be enhanced. Further, in a facsimile transmission, since this apparatus makes it possible to transmit without waiting for an entire page to be read, communication time can be, reduced. This effect is particularly noticeable with long documents.

(9) Another embodiment of a compound image-forming apparatus related to the present invention comprises a scanner controller; a file manager; and an image creation device, which prepares file information communicated from the scanner controller as document management information for the file manager, prepares page information communicated from the scanner controller as page management information for the file manager, prepares the number of partitions and addresses communicated from the scanner controller as partition management information for the file manager, and prepares write-band address information communicated from the scanner controller as band information for the file manager. Therefore, installing a file system, which is capable of managing a partition, makes it possible to mount an operable input/output device in an MFP without being consciously aware of the characteristics of a one-page image. As a result, it is possible to obtain effects, which enable the reuse of a past input/output device resource, and which eliminate the need to take into account image characteristics even when creating a new image.

(10) Another embodiment of a compound image-forming apparatus related to the present invention comprises a file manager; and an output device, which references document management information for the file manager, references page information as page management information for the file manager, references the number of partitions and addresses as partition management information for the file manager, references band address information as band information for the file manager, inputs information to the image creation device, specifies the optimum compression format and resolution for the output device itself, and starts outputting. Therefore, installing a file system, which is capable of managing a partition, makes it possible to mount an operable input/output device in an MFP without being consciously aware of the characteristics of a one-page image. As a result, effects, which enable the reuse of a past input/output device resource, and which eliminate the need to take into account image characteristics even when creating a new image, can be obtained.

(11) Another embodiment of a compound image-forming apparatus related to the present invention comprises an image creation device; an output device, which references document management information for the file manager, references page information as page management information for the file manager, references band address information as band information for the file manager, and requests the optimum compression format and resolution for the output device itself from the file system; a file manager, which references the number of partitions and addresses as partition management information for itself, the file manager; and a file system, which inputs page, partition and band information to the image creation device, inputs the optimum compression format and resolution specified by the output device to the image creation device, and starts outputting. Therefore, installing a file system, which is capable of managing a partition, makes it possible to mount an operable input/output device in an MFP without being consciously aware of the characteristics of a one-page image. As a result, effects, which enable the reuse of a past input/output device resource, and which eliminate the need to take into account image characteristics even when creating a new image, can be obtained.

(12) Another embodiment of a compound image-forming apparatus related to the present invention comprises a file manager; a scanner controller; and an image creation device, which, based on an original image file ID delivered from the file manager, carries out a document opening process for the file manager, carries out a page opening process for the file manager, and prepares write band address information communicated from the scanner controller as band information for the file manager. Therefore, a pre-output preview image or thumbnail image can be created in a general format, making it easier to reuse. Further, it is also easier to handle a file when it is transferred outside of the MFP.

(13) Another embodiment of a compound image-forming apparatus related to the present invention comprises a scanner controller; a file manager; and an image creation device, which, based on an original image file ID delivered from the file manager, carries out a document opening process for the file manager, carries out a page opening process for the file manager, creates thumbnail image information for the file manager, creates partition management information for the file manager, and prepares write band address information communicated from the scanner controller as band information for the file manager. Therefore, since it is also possible to subject a pre-output preview image or thumbnail image to page partitioning, partitioning a preview image or thumbnail image within a scope displayable on a screen makes it possible to link the image in partitioned units when scrolling. Consequently, it becomes possible to reduce the amount of memory for creating a page.

(14) Another embodiment of a compound image-forming apparatus related to the present invention comprises a scanner controller; a file manager; and an image creation device, which, based on an original image file ID delivered from the file manager, carries out a document opening process for the file manager, carries out a page opening process for the file manager, creates thumbnail image information for the file manager, partitions a thumbnail image and preview image, creates partition management information for the file manager, and prepares write band address information communicated from the scanner controller as band information for the file manager. Therefore, since this apparatus can make use of a common image, and, in a copying operation, enables printing without waiting for an entire page to be read, fast printing and other such printing performance capabilities can be enhanced. Further, in a facsimile transmission, since this apparatus makes it possible to transmit without waiting for an entire page to be read, communication time can be reduced. This effect is particularly noticeable with long documents.

The respective embodiments of the present invention will be explained in detail hereinbelow by referring to the figures.

[Embodiment 1]

FIG. 1 shows the constitution of a compound image-forming apparatus, which applies a compound image-forming method related to this embodiment.

The compound image-forming apparatus shown in this figure comprises a main controller 150; an operation controller 151; a G3/G4 controller 152; a plotter controller 153; an address manager 154; a file manager 155; a report controller 156; a network controller 157; an email controller 158; user information 159; a display controller 160; an image creation device controller 161; a scanner controller 162; a job controller 163; a job log 164; an internal switch 165; a page frame controller 166; a thumbnail image creation unit 167; a preview image creation unit 168; and a bus line 169.

The main controller 150 has functions for the overall control of the compound image-forming apparatus, and, for example, uses a microprocessor (The main controller 150 is connected to RAM and ROM not shown in the figure.). The operation controller 151 exercises control over key operations and button operations so as to prevent erroneous operations, abnormal operations and unnecessary operations. The G3/G4 controller 152 carries out data control corresponding to G3 (an international facsimile standard for use with analog telephone networks) and G4 (an international facsimile standard for use with digital lines (ISDN)). The plotter controller 153 controls the transfer of data when the output device is a plotter (corresponds to the output device). The address manager 154 identifies and determines the transmission destination of data, and reliably receives the data. The file manager 155 manages a data file (corresponds to a file creation system).

The report controller 156 manages the history of facsimile transmissions and receptions and creates a report. The network controller 157 controls the transfer of data when the compound image-forming apparatus is connected to the Internet. The email controller 158 controls the transfer of an email address and email data. User information 159 is data such as the name of the user of the compound image-forming apparatus, the location, purchase date, utilization status, malfunction/repair status, and, as used here, signifies a memory for storing this information. The display controller 160 has functions for displaying an operation state and operation button on a display panel. The image creation device controller 161 processes various types of data, which will be explained hereinbelow (corresponds to an image creation system).

The scanner controller 162 controls the reading of a document by a scanner (corresponds to an input device). The job controller 163 controls job login and logout. The job log 164 signifies the standard output/error output of a job. The internal switch 165 is a switch for carrying out various types of settings. The page frame controller 166 controls a page frame. The thumbnail image creation unit 167 creates a reduced image for displaying numerous images in list form. The preview image creation unit 168 creates a temporary output image prior to an official output by a printer or the like.

Figure 2:
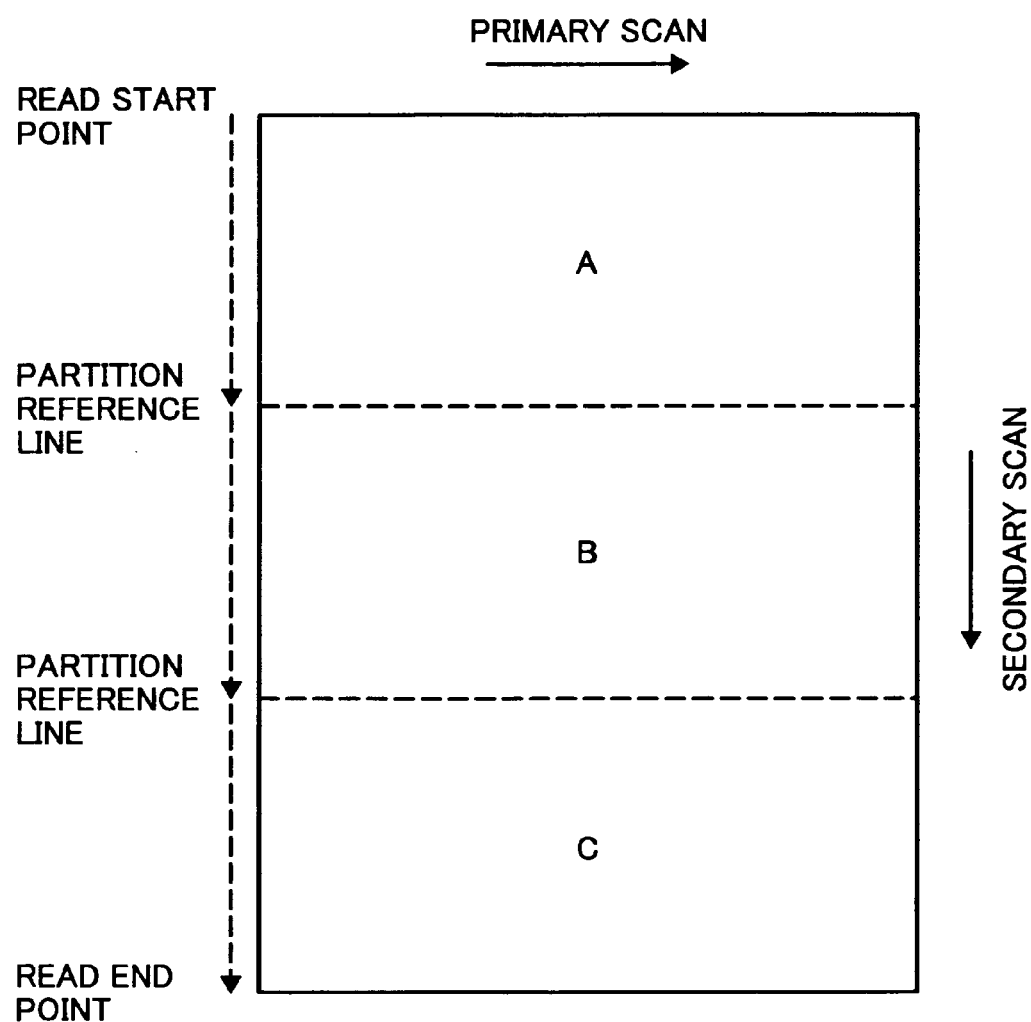
FIG. 2 is a schematic diagram of partitioning by the compound image-forming apparatus shown in FIG. 1.

Next, partitioning in the compound image-forming apparatus shown in FIG. 1 will be explained by referring to FIG. 2.

In the compound image-forming apparatus shown in FIG. 1, partitioning refers to partitioning an image and carrying out JPEG compression every certain set number (number of partition lines: in this case 3) in the secondary scanning direction (vertical direction in the figure: direction in which the document is being conveyed). That is, the document in FIG. 2 is partitioned and JPEG compression is carried out in three areas: area A from the read start point to the first partition reference line; area B from the first partition reference line to the second partition reference line; and area C from the second partition reference line to the end point.

Figure 3:
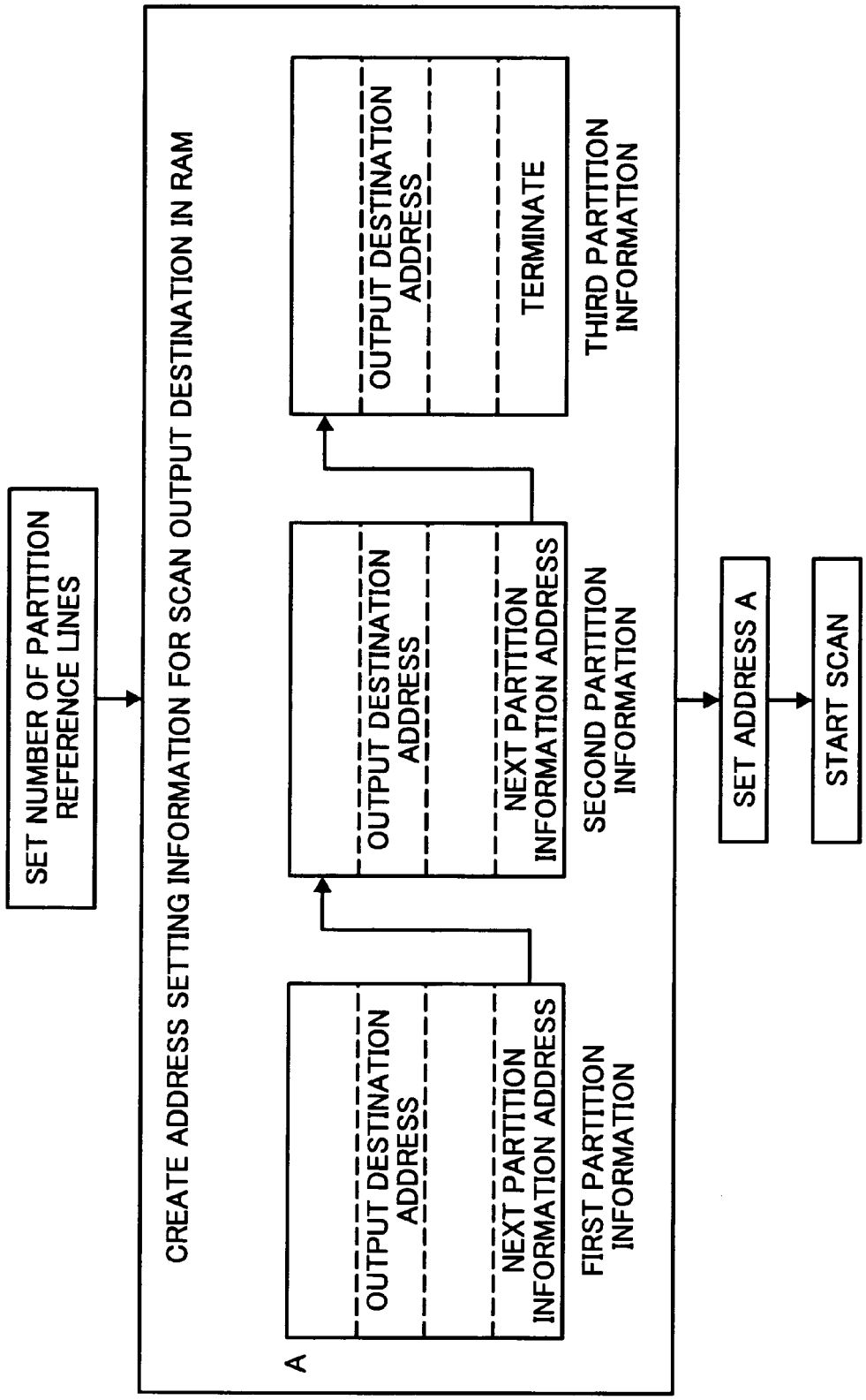
FIG. 3 is a schematic diagram of software control in the compound image-forming apparatus shown in FIG. 1.

FIG. 3 is a diagram illustrating software control in the compound image-forming apparatus shown in FIG. 1. Software for controlling the image creation device, which carries out image partitioning and JPEG compression, will be explained hereinbelow.

STEP 1: The main controller 150 (refer to FIG. 1) sets the number of partition reference lines in the image creation device controller 161 (refer to FIG. 1).

STEP 2: The main controller 150 creates a partition descriptor in RAM as shown in FIG. 3. That is, it creates address setting information for a scan output destination in RAM. The individual tables correspond to and are linked with the partitioning units.

STEP 3: The main controller 150 sets the head address of the partition descriptor in the image creation device controller 161.

STEP 4: The main controller 150 issues read instructions to the scanner controller 162.

STEP 5: The image creation device controller 161 carries out JPEG compression for only a set number of lines worth of an inputted image.

STEP 6: The image creation device controller 161 outputs JPEG compressed data to the output destination address written in the partition descriptor. The main controller 150 sets address A and starts the scanner.

When a thumbnail image or preview image is required here, the main controller 150 creates a separate partition descriptor in STEP 2. However, in this case, only one partition table is made.

[Embodiment 2]

Figure 4:
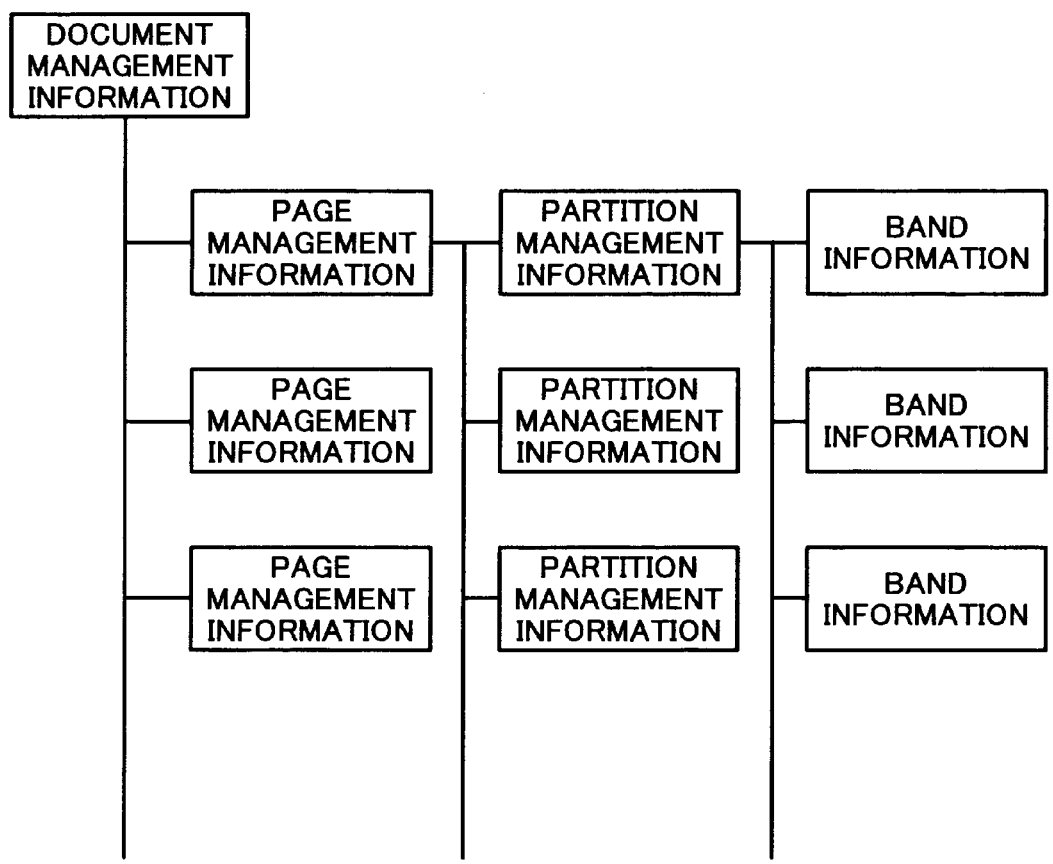
FIG. 4 is a schematic diagram of embodiment 2 of the compound image-forming method related to the present invention.

Next, a compound image-forming method related to this embodiment will be explained by referring to FIG. 4.

In an ordinary image file system, an actual image is managed in the hierarchy of document→page→band. The image file system of the present invention manages an actual image in the hierarchy of document→page→partition→band→actual image.

STEP 1: The image creation device controller 161 (refer to FIG. 1) prepares file information (document name) communicated from the scanner controller 162 (refer to FIG. 1) as document management information for the file manager 155 (refer to FIG. 1).

STEP 2: The image creation device controller 161 prepares page information (width, number of lines) communicated from the scanner controller 162 as page management information for the file manager 155.

STEP 3: The image creation device controller 161 prepares the number of partitions and addresses communicated from the scanner controller 162 as partition management information for the file manager 155.

STEP 4: The image creation device controller 161 prepares write band address information communicated from the scanner controller 162 as band information (number of lines information for a certain portion of an image) for the file manager 155.

[Embodiment 3]

Next, a compound image-forming method related to this embodiment will be explained by referring to FIG. 5.

When making simple use of this file system, the plotter, facsimile and email (network) output is carried out via the following process (Shows the operation of the output device of the figure).

STEP 1: The output device references document management information for the file manager 155 (refer to FIG. 1).

STEP 2: The output device references page information (width, number of lines) as page management information for the file manager 155.

STEP 3: The output device references an address as partition management information for the file manager 155.

STEP 4: The output device references band address information as band information for the file manager 155.

STEP 5: The output device inputs the above-mentioned information to the image creation device controller 161 (refer to FIG. 1), sets the optimum compression format, resolution, and so forth for the output device itself, and starts outputting.

Furthermore, two image creation devices are shown in the figure to show that the image creation device takes part in both image input and image output. Further, the downward-facing arrow from the output device represents the fact that operation proceeds to post-processing, which is not shown in the figure.

[Embodiment 4]

A compound image-forming method related to this embodiment will be explained by referring to FIG. 6.

For the system of the above-mentioned embodiment 3, the output-side controllers must be aware of partitioning, and must carry out the reconstruction of optimum images on their own. Accordingly, the file system itself, which the plotter, facsimile and email (network) output-side controllers use in common, makes use of the partition information to provide an interface for general file page input/output. The flow of processing at this time is shown below.

If there is a request for a facsimile output, the conversions from JPEG to MMR, and from color to black-and-white are also carried out inside the file system. STEP 1 through STEP 6 below show the operation of the output device.

STEP 1: The output device references document management information for the file manager 155 (refer to FIG. 1).

STEP 2: The output device references page information (width, number of lines) as page management information for the file manager 155.

STEP 3: Using STEP 2 as a trigger, the file manager 155 references the number of partitions and addresses as partition management information for itself, the file manager.

STEP 4: The output device references band address information as band information for the file manager 155.

STEP 5: The output device requests from the file system the optimum compression format, resolution and so forth for the output device itself.

STEP 6: The file manager 155 (refer to FIG. 1) inputs page, partition, and band information to the image creation device controller 161 (refer to FIG. 1), inputs the optimum compression format, resolution, and so forth specified from the output device itself to the image creation device controller 161, and starts outputting. Furthermore, the downward-facing arrow from the output device represents the fact that operation proceeds to post-processing, which is not shown in the figure.

[Embodiment 5]

Figure 8:
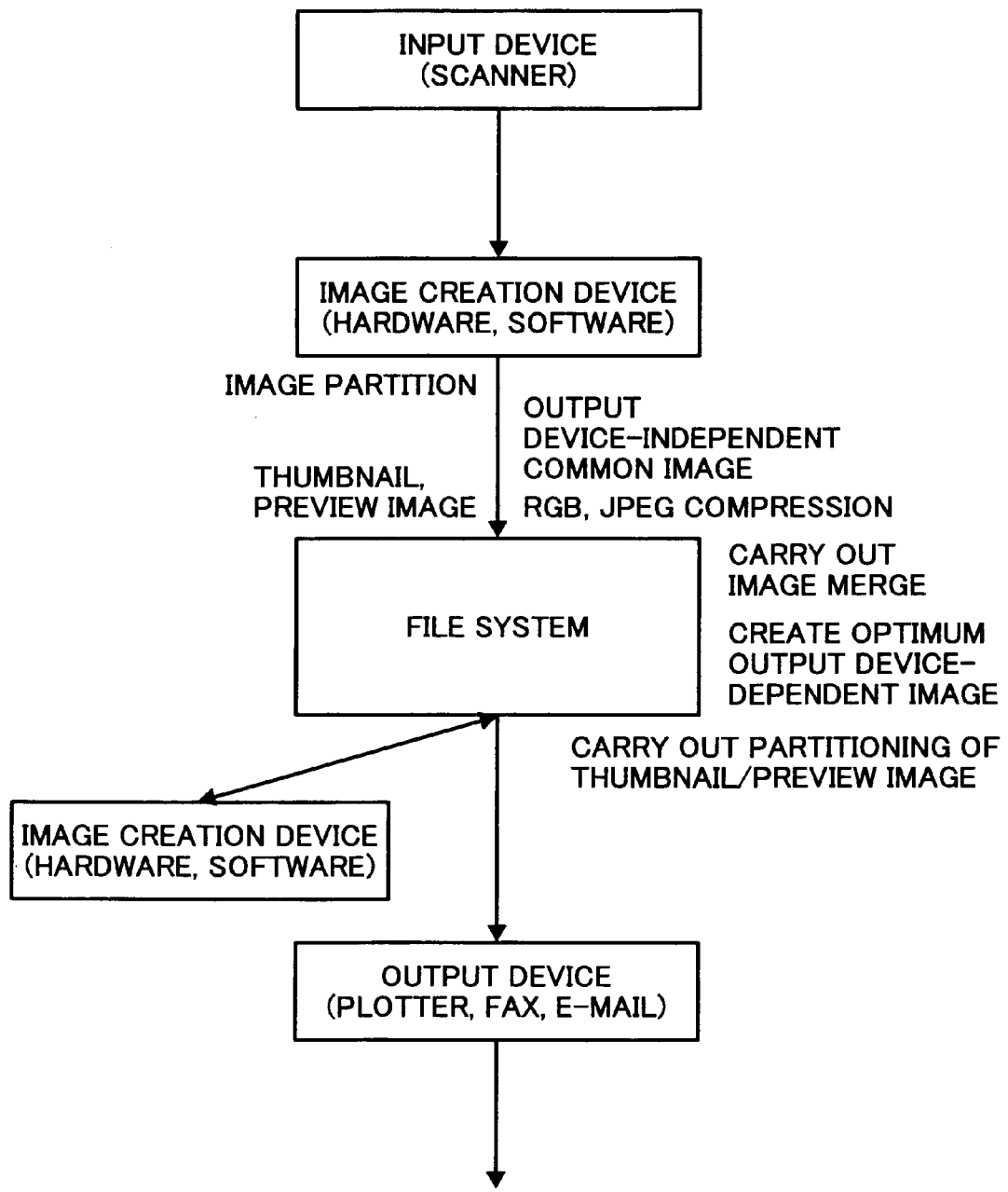
FIG. 8 is a schematic diagram of embodiment 5 of the compound image-forming method related to the present invention.

A compound image-forming method related to this embodiment will be explained next by referring to FIG. 8.

An image for a thumbnail or for preview is outputted along the path input device→image creation device at low resolution and without being partitioned. STEP 1 through STEP 3 below show the operation of the image creation device.

STEP 1: The image creation device controller 161 (refer to FIG. 1), based on an original image file ID delivered from the file manager 155, carries out a document opening process for the file manager 155 (This is a procedure for referencing an image comprising a plurality of pages, and is carried out first. The respective pages can be accessed via this procedure.).

STEP 2: The image creation device controller 161 carries out a page opening process for the file manager 155 (This is a procedure for accessing an image.).

STEP 3: The image creation device controller 161 prepares write band address information communicated from the scanner controller 162 as band information for the file manager 155.

Furthermore, the image merge in the figure is managed and processed such that the plurality of partitioned pages become continuous. Further, the downward-facing arrow from the output device represents the fact that operation proceeds to post-processing, which is not shown in the figure.

[Embodiment 6]

A compound image-forming method related to this embodiment will be explained next by referring to FIG. 9.

Figure 9:
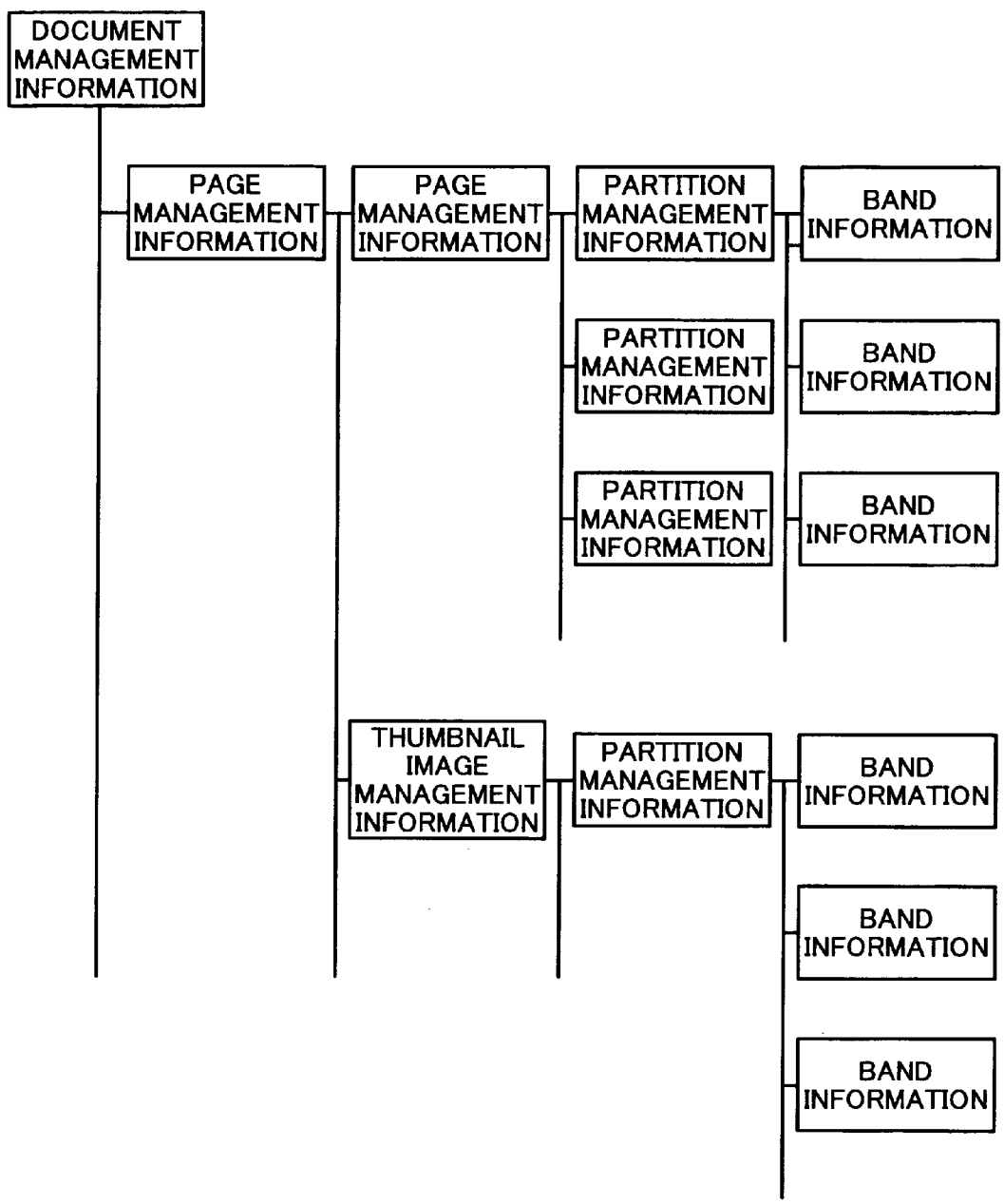
FIG. 9 is a schematic diagram of embodiment 6 of the compound image-forming method related to the present invention.

In this case, the constitution of the file system is as shown in FIG. 9, and the management system will differ for ordinary images and thumbnail or preview images. Or, the images can be managed in the form of a single partition at all times.

STEP 1: The image creation device controller 161 (refer to FIG. 1), based on an original image file ID delivered from the file manager 155 (refer to FIG. 1), carries out a document opening process for the file manager 155.

STEP 2: The image creation device controller 161 carries out a page opening process for the file manager 155.

STEP 3: The image creation device controller 161 creates thumbnail image information for the file manager 155.

STEP 4: The image creation device controller 161 creates partition management information for the file manager 155.

STEP 5: The image creation device controller 161 prepares write band address information communicated from the scanner controller 162 (refer to FIG. 1) as band information for the file manager 155.

[Embodiment 7]

Figure 10:
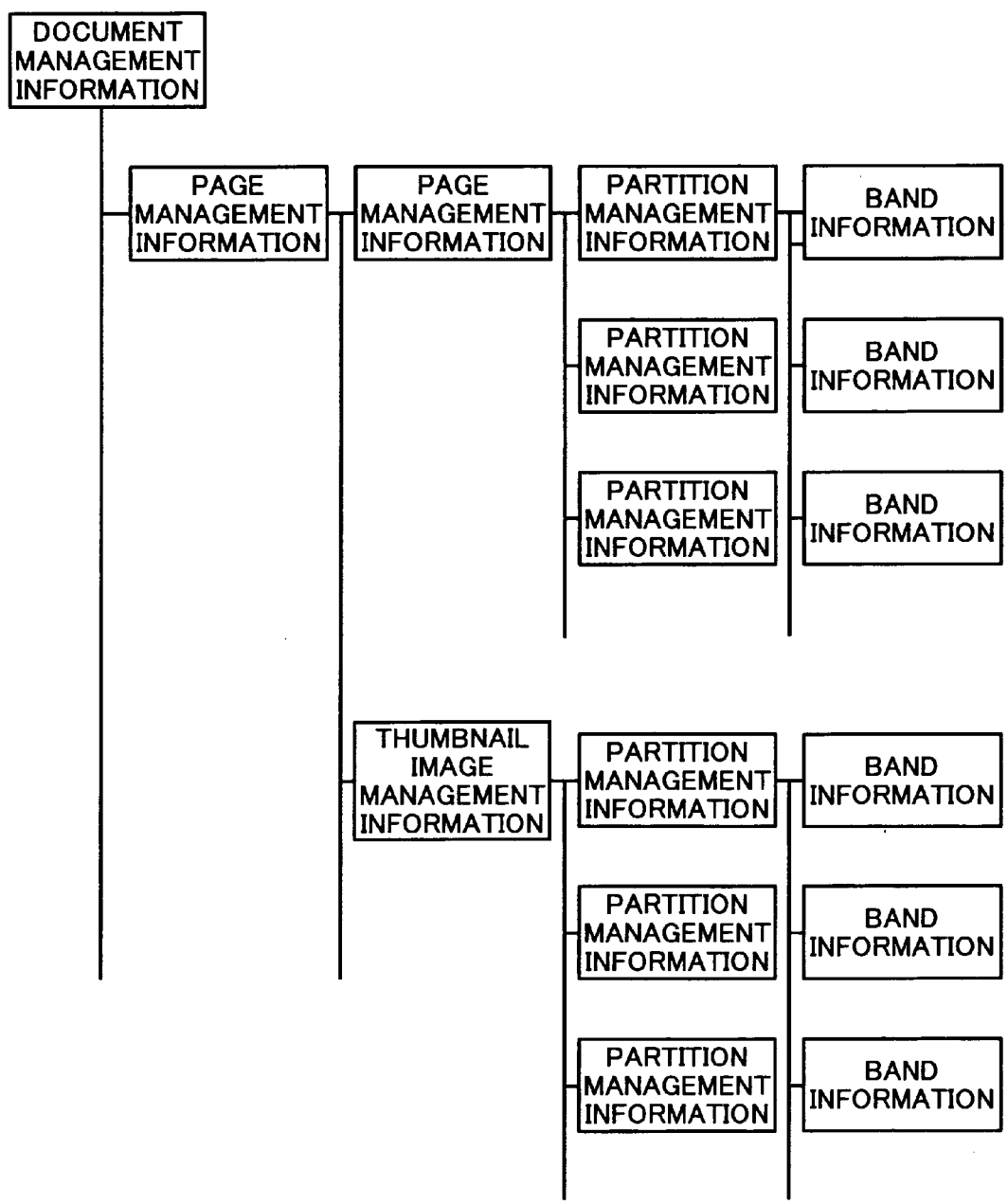
FIG. 10 is a schematic diagram of embodiment 7 of the compound image-forming method related to the present invention.

A compound image-forming method related to this embodiment will be explained next by referring to FIG. 10.

There may be times when it is better to manage a thumbnail image or a preview image in accordance with partitions as described hereinbelow. At these times, it is possible to select a management method as described below. The partitioning unit at this time, for example, can be set to a unit that is convenient for the operation panel display instead of a unit that is convenient for outputting.

STEP 1: The image creation device controller 161 (refer to FIG. 1), based on an original image file ID delivered from the file manager 155 (refer to FIG. 1), carries out a document opening process for the file manager 155.

STEP 2: The image creation device controller 161 carries out a page opening process for the file manager 155.

STEP 3: The image creation device controller 161 creates thumbnail image information for the file manager 155.

STEP 4: The image creation device controller 161 partitions a thumbnail image or preview image.

STEP 5: The image creation device controller 161 creates partition management information for the file manager 155.

STEP 6: The image creation device controller 161 prepares write band address information communicated from the scanner controller 162 (refer to FIG. 1) as band information for the file manager 155.

[Embodiment 8]

Figure 11:
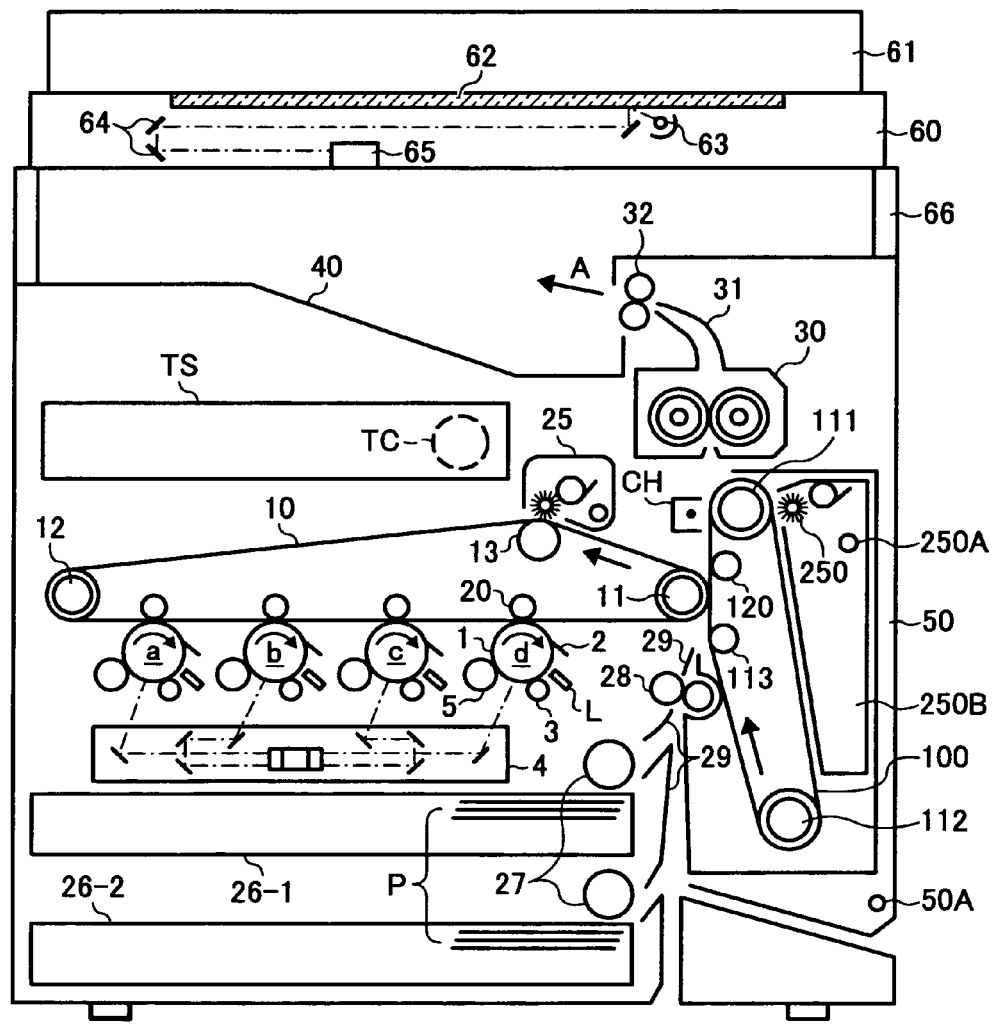
FIG. 11 is a diagram showing the constitution of an embodiment of a compound image-forming apparatus, which applies the compound image-forming method related to the present invention.

FIG. 11 shows the constitution of a compound image-forming apparatus, which applies a compound image-forming method related to this embodiment.

A neutralization device L, a cleaning device 2, a charger 3, and a developer 5 are positioned on the periphery of a photosensitive body 1, which is rotatably supported, and which rotates in the direction of the arrow in FIG. 11. A space is left open between the charger 3 and the developer 5 on the periphery of the photosensitive body 1 for making light information emitted from an exposure device 4 incident on the photosensitive body 1.

In the constitution shown in FIG. 11, there are four (1*a*, 1*b*, 1*c*, 1*d*) photosensitive bodies 1, but the constitutions of the respective peripherally provided above-mentioned image-forming components are the same, and only the color of the coloring material (toner) handled by the developer 5 differs.

The photosensitive body 1 is constituted by providing an organic semiconductor layer, which is a photoconductive material, on the surface of an aluminum tube with a diameter of between 30 mm and 100 mm, and one part thereof makes contact with an intermediate transfer belt (a first toner image support means) 10.

The intermediate transfer belt 10 is supported by rollers 11, 12, 13, which rotate, and is stretched therebetween so as to be able to move in the direction of the arrow in FIG. 11. A first transfer means 20 is positioned in proximity to a photosensitive body 1 on the backside (the inner side of the loop) of this intermediate transfer belt 10, and transfers an image on a photosensitive body 1 to the intermediate transfer belt 10.

An intermediate transfer belt cleaning device 25 is positioned on the outer side of the belt loop of the intermediate transfer belt 10 downstream of the location where a toner image from the intermediate transfer belt 10 is transferred to either a recording medium or a rear-surface intermediate transfer belt (second toner image support means) 100. This cleaning device 25 wipes off unnecessary toner remaining on the surface of the belt subsequent to a toner image having been transferred from the intermediate transfer belt 10.

The exposure device 4 is a known laser system, and irradiates light information corresponding to the forming of a full color image as a latent image on the surface of the charged photosensitive body 1. An exposure device comprising an LED array and image-forming means can also be used as this exposure device 4.

Thus, the above-mentioned photosensitive body 1, cleaning device 2, charger 3, exposure device 4, developer 5, neutralization device L and first transfer means 20 function as an image-creating means for creating a toner image (image resulting from toner), which is transferred to the intermediate transfer belt 10.

The intermediate transfer belt 10 comprises a resin film or rubber base material measuring between 50 $\mu$m and 600 $\mu$m thick, and has a value of resistance, which enables the transfer of toner from the photosensitive body 1.

A belt-shaped rear-surface intermediate transfer belt (second toner image support means) 100 is positioned on the right side of FIG. 11 relative to this intermediate transfer belt 10. This rear-surface intermediate transfer belt 100 is supported by rotating rollers 111, 112, 113, and is stretched therebetween so as to be able to move in the direction of the arrow in FIG. 11, and a second transfer means 120 is positioned on the back side (the inner side of the loop). A cleaning device 250, charger CH and so forth for this rear-surface intermediate transfer belt are positioned on the outer side of the belt loop of the rear-surface intermediate transfer belt 100.

The cleaning device 250 wipes off unnecessary toner remaining on the rear-surface intermediate transfer belt 100 subsequent to toner having been transferred to a piece of paper.

The intermediate transfer belt 10 and rear-surface intermediate transfer belt 100 are brought into contact with one another in accordance with the above-mentioned second transfer means 120, roller 113, and a roller 11, which supports the intermediate transfer belt 10, to form a pre-established transfer nip.

The rear-surface intermediate transfer belt 100 comprises a resin film or rubber base material measuring between 50 $\mu$m and 600 $\mu$m thick, and has a value of resistance, which enables the transfer of toner from the intermediate transfer belt 10.

Recording media (paper) P is stored in paper feeding devices (paper feeding cassettes) 26-1, 26-2 at the bottom of the figure, and the uppermost paper is conveyed by a paper feeding roller 27 one piece at a time via a plurality of guides 29 to a pair of resist rollers 28.

Heating means for fixing 30, a pair of paper discharge guides 31, a pair of paper discharge rollers 32, and a discharged-paper stacker 40 are positioned further downstream to where the recording medium P is conveyed.

In FIG. 11, above the intermediate transfer belt 10 but below the discharged-paper stacker 40 there is provided a storage unit TS, where a supply of toner can be stored. The toner is provided in cartridge TC form, and comes in four colors: magenta, cyan, yellow and black. The corresponding color is appropriately supplied from this cartridge TC to the developer using a powder pump and the like.

A frame 50, which is one part of the main body of this apparatus, is structured around an operating spindle 50A so as to be able to rotate and open. Thus, by opening up this frame 50, a user can expose the conveyance path of the recording media, facilitating the removal of a recording medium (piece of paper) when a jam occurs.

Further, the constitution is such that image reading means 60 is connected via a support part 66 to the upper part of the main body of the apparatus, which carries out the above-described image formation to a recording medium P, and a copying operation is made possible by the above-described apparatus main body printing image data read by this image reading means 60 onto a recording medium P.

This image reading means 60 comprises an automatic document feeder (ADF) 61, contact glass 62, an exposure lamp 63, and a plurality of reflection mirrors 64, which reflect reflected light from a document image resulting from the exposure lamp 63, and guide this reflected light to a pre-scribed light path, and an image sensor array 65 for receiving the guided reflected light, and is constituted such that either one side or both sides of a document image are readably set on the contact glass 62 automatically by the automatic document feeder 61 to enable reading.

On the periphery of image reading means 60 there is provided an operation/display unit (display means and input means) not shown in the figure. This operation/display unit comprises a touch panel, a ten-key pad and various types of buttons for receiving input, as well as notifying a user of operational information via the display. The user utilizes this operation/input unit to carry out various types of operations, such as switching from one-side to two-sided copying, starting a copying operation, setting the number of copies to be made, and switching between the copy function and the print function.

Next, an operation for carrying out two-sided printing using an image-forming apparatus of this embodiment will be explained.

First, image creation is carried out by image creating means. In accordance with the operation of the exposure device 4, a light from a LD (Laser Diode) light source not shown in the figure is applied via an optical component not shown in the figure to photosensitive body 1a, the first of the photosensitive bodies 1 uniformly charged by the charger 3, and forms a latent image corresponding to the write information (information corresponding to color).

The latent image of the photosensitive body 1a is developed by the developer 5, and toner is used to form and maintain a toner image on the surface of the photosensitive body 1a. This toner image is transferred to the surface of the intermediate transfer belt 10, which is moving in synch with the photosensitive body 1a, by first transfer means 20. The surface of the photosensitive body 1a is prepared for the next image-creating cycle by the cleaning device 2 cleaning the residual toner, and the neutralization device L carrying out neutralization.

The intermediate transfer belt 10 supports the toner image, which was transferred to its surface, and moves in the direction of the arrow in FIG. 11. Using the same operation as that for the above-mentioned photosensitive body 1a, a latent image corresponding to a different color is written to photosensitive body 1b, and developed with toner of the color corresponding thereto to form a toner image. This toner image is aligned with the toner image of the previous color, which has already been transferred to the intermediate transfer belt 10, and, ultimately, a four-color toner image formed by photosensitive bodies 1a through 1d is built up.

The rear-surface intermediate transfer belt 100 is moving in synch at this time in the direction of the arrow, and the toner image transferred to the surface of the intermediate transfer belt 10 is transferred to the surface of the rear-surface intermediate transfer belt 100 via the action of second transfer means 120.

Thus, the image-forming apparatus of this embodiment is constituted such that the intermediate transfer belt 10 and rear-surface intermediate transfer belt 100 move, and image creation progresses forward as toner images are formed on four so-called tandem format photosensitive bodies 1, thereby making it possible to shorten the time required for the processes of forming toner images on the photosensitive bodies 1 and transferring them to the intermediate transfer belt 10 and rear-surface intermediate transfer belt 100.

When the intermediate transfer belt 10 moves to a pre-scribed location, the toner image, which is to be transferred to one surface (front surface) of a recording medium P, is created by recreation means using the above-described process, and paper feeding is started. When the paper feeding roller 27 rotates counterclockwise, the recording medium P in the uppermost part of the inside of the paper feeding device (paper feeding cassette) 26 is pulled out, and conveyed to the pair of resist rollers 28.

The toner image of the intermediate transfer belt 10 is transferred by second transfer means 120 to the surface (front surface) of one side of the recording medium P, which has been conveyed between the intermediate transfer belt 10 and the rear-surface intermediate transfer belt 100 via the pair of resist roller 28.

Furthermore, in FIG. 11, the recording medium P is conveyed upwards, and the toner image on the surface of the rear-surface intermediate transfer belt 100 is transferred to one more surface (rear surface) of the recording medium P by the charger CH. At transfer time, the recording medium P is conveyed at a timing computed by the main controller 150 so that the location of the image is regular.

In this embodiment, the toner, which creates an image on a photosensitive body 1, is minus polarity. The toner image (toner), which creates an image on a photosensitive body 1, is transferred to the intermediate transfer belt 10 by applying a positive charge to first transfer means 20. Furthermore, the toner, which creates an image on the intermediate transfer belt 10, is transferred to the rear-surface intermediate transfer belt 100 by applying a positive charge to second transfer means 120.

Thus, after the toner on the surface of the intermediate transfer belt 10 is transferred to the surface (front surface) of the one side of the recording medium P as described above, the minus polarity toner on the surface of the rear-surface intermediate transfer belt 100 is absorbed and transferred to the other surface (rear surface) of the recording medium P by applying a plus polarity charge from the charger CH.

The recording medium P, which has had toner images transferred to both surfaces by the above-described operations, is sent to fixing means 30, the toner images on both sides of the recording medium are melted at the same time and fixed, and the recording medium P is discharged to the discharged-paper stacker 40 on the upper part of the main body frame by the pair of paper discharge rollers 32 via the pair of guides 31.

When the image-forming apparatus constitutes a paper discharge unit 40 as shown in FIG. 11, since the surface (page) of the recording medium P on which an image, which was created by image creating means and transferred to the recording medium P latterly from among the respective surface images printed on both sides of the recording medium P, that is, the surface (front surface) of the recording medium P to which the image was directly transferred from the intermediate transfer belt 10, is placed face down in the discharged-paper stacker 40, and thus, in order to collate pages, the second page image can be created in advance by image creating means G and this toner image (toner) can be maintained on the rear-surface intermediate transfer belt 100, and the first page image can be directly transferred to the recording medium P from the intermediate transfer belt 10.

The image to be transferred to the front surface of the recording medium P from the intermediate transfer belt 10 is exposed and formed on the surface of the photosensitive body 1 as a normal (non-reverse) image, and the toner image to be transferred to the rear surface of the recording medium from the rear-surface intermediate transfer belt 100 is exposed and formed on the surface of the photosensitive body 1 as a reverse image (mirror image).

An image creation procedure for collating pages like as this can be realized by using known technology for storing image data in a storage means (memory), and further, exposing an image to be formed so as to switch between a normal image and a reverse (mirror) image can be realized by using known image processing technology.

Subsequent to transferring an image to a recording medium P from the rear-surface intermediate transfer belt 100, the cleaning device 250, which comprises a known brush roller, recovery roller, blade and so forth on the inside, removes unnecessary toner and paper dust remaining on the surface of the rear-surface intermediate transfer belt 100.

In FIG. 11, the brush roller 250 is separated from the surface of the rear-surface intermediate transfer belt 100. This brush roller 250 is rockably disposed around a fulcrum 250A, and constitutes a structure capable of making contact with and separating from the surface of the rear-surface intermediate transfer belt 100.

Prior to a toner image, which is transferred from the intermediate transfer belt 10, being transferred to a recording medium P, that is, when the rear-surface intermediate transfer belt 100 is carrying the toner image, the brush roller 250 is in a separated state, and when the image is transferred to the recording medium P and cleaning becomes necessary, system controlling means 301 rocks the brush roller 250 in the counterclockwise direction in FIG. 11, causing the brush roller 250 to make contact with the surface of the rear-surface intermediate transfer belt 100.

The unnecessary toner that is removed is collected in the toner storage unit 250B.

Figure 7A:
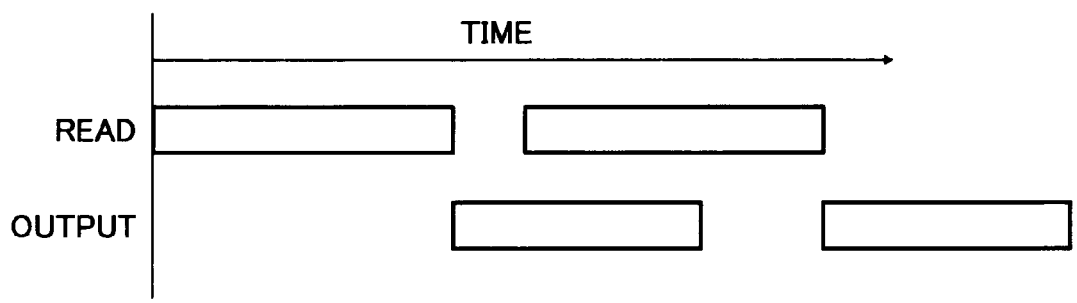
FIG. 7A is a diagram showing the processing time of a conventional compound image-forming apparatus relative to the effect of the compound image-forming apparatus shown in FIG. 1.
Figure 7B:
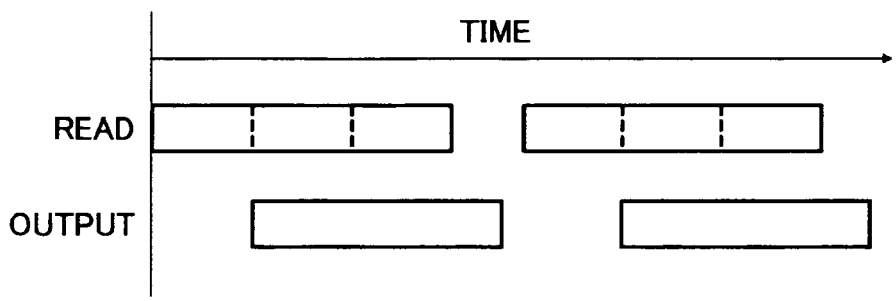
FIG. 7B is a diagram showing the processing time of a compound image-forming apparatus related to the present invention relative to the effect of the compound image-forming apparatus shown in FIG. 1.

The effects of the compound image-forming apparatus shown in FIG. 1 will be explained by referring to FIGS. 7A and 7B. FIG. 7A is a diagram showing the processing time for a conventional compound image-forming apparatus, and FIG. 7B is a diagram showing the processing time of a compound image-forming apparatus related to the present invention. It is clear from FIGS. 7A and 7B that the processing time of a compound image-forming apparatus related to the present invention is shorter.

According to the present invention, it is possible to use a common image by reading in a document, partitioning a one-page image into an arbitrary number of units at the same time as the document is being read, and compressing the partitioned image, and in a copy operation, printing can be carried out without waiting for an entire page to be read in, thereby making it possible to enhance fast printing and other such printing performance capabilities. Further, in a facsimile transmission, transmission can be carried out without waiting for an entire page to be read in, thereby making it possible to reduce communication time.

The present invention has the following effects.

(1) Makes it possible to use a common image, and, in a copying operation, enables printing without waiting for an entire page to be read, thus making it possible to enhance fast printing and other such printing performance capabilities. Further, in a facsimile transmission, transmission can be carried out without waiting for an entire page to be read, thereby enabling communication time to be reduced. This effect is particularly noticeable with long documents.

(2) Installing a file system capable of managing a partition makes it possible to mount an operable input/output device in an MFP without being consciously aware of the characteristics of a one-page image. As a result, there is achieved an effect, which enables the reuse of a past input/output device resource, and an effect, which eliminates the need to take into account image characteristics even when creating a new image.

(3) A pre-output preview image or thumbnail image can be created in a general format, facilitating reuse. Further, it is also easier to handle a file when it is transferred outside of the MFP.

(4) Also makes it possible to subject a pre-output preview image or thumbnail image to page partitioning, and if partitioning is carried out within a scope displayable on a screen, makes it possible to link the image together in partitioned units when scrolling. Consequently, it becomes possible to reduce the amount of memory for creating a page.

Various modifications will become possible for those skilled in the art after receiving the teachings of the present disclosure without departing from the scope thereof.

What is claimed is:

1. A compound image-forming method, comprising the steps of:

reading a document;

partitioning a one-page image into an arbitrary number of image partition portions as the document is being read;

creating, by an image processing apparatus, before the reading of the document is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and compressing the image partition portions of the partitioned image.

2. The compound image-forming method of claim 1, further comprising:

merging the compressed image partition portions in order to generate a continuous image for output.

3. The compound image-forming method of claim 1, wherein the image processing apparatus accesses data stored in a first partition unit among the plural partition units, the first data corresponding to a first image partition portion of the input image, and the image processing apparatus access data stored in a second partition unit of the plural partition units that is subsequent to the first partition unit, based on the next partition information address included in the first partition unit.

4. A compound image-forming method, comprising the steps of:
 partitioning a one-page image into an arbitrary number of image partition portions as the document is being read;
 creating, by an image processing apparatus, before the reading of the document is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and
 reading the image by image partition portion, based on the partition units;
 writing the image by image partition portion, based on the partition units; and
 configuring a one-page image using all the image partition portions of the image.

5. The compound image-forming method as claimed in claim 4, wherein the one-page image is partitioned into the plural image partition portions, the partitioned image is compressed, and the compressed image is handled and outputted as one continuous image.

6. A compound image-forming method, comprising the steps of:
 inputting an image;
 executing, and concealing, partitioning of the inputted image into plural image partition portions, using a file system, by creating, by an image processing apparatus, before reading of the image is initiated, a partition descriptor that includes plural partition units corresponding to the plural image partition portions of the image, each specific partition unit of the partition units including (i) an output destination address of the corresponding image partition portion, the output destination address indicating an address to which the corresponding image partition portion is to be outputted before the reading of the image is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and
 handling the partitioned portions of the image as a continuous image for an input/output device.

7. A compound image-forming method, comprising:
 partitioning an original image into an arbitrary number of image partition portions as the document is being read;
 creating, by an image processing apparatus, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and
 creating a pre-output preview image or thumbnail image of the original image without carrying out page partitioning.

8. A compound image-forming method, comprising:
 partitioning an original image into an arbitrary number of image partition portions as the document is being read;
 creating, by an image processing apparatus, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and
 associatively managing a non-partitioned preview image or thumbnail image of the original image with the partitioned original image.

9. A compound image-forming method, comprising the steps of:
 partitioning an original image into an arbitrary number of image partition portions as the document is being read;
 creating, by an image processing apparatus, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image;
 enabling to select whether or not a preview image or thumbnail image of the original image is subjected to page partitioning; and
 carrying out file management.

10. A compound image-forming apparatus, comprising:
 a main controller that sets a number of partition reference lines to partition an image into plural image partition portions, creates, before obtaining the image, a partition descriptor in RAM that includes plural partition units corresponding to the plural image partition portions, each specific partition unit of the partition units including an (i) output destination address of the corresponding image partition portion, the output destination address indicating an address to which the corresponding image partition portion is to be outputted before the image is completely obtained, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image, sets a partition descriptor head address, and carries out a read instruction to a scanner controller for an image creation device controller; and an image creation device controller, which carries out JPEG compression for only a set number of lines worth of an inputted image corresponding to an image partition portion, and outputs the JPEG-compressed data to the output destination address corresponding to the image partition portion written in the partition descriptor.

11. A compound image-forming apparatus, comprising:

a scanner controller;

a file manager; and an image creation device that partitions an original image into an arbitrary number of image partition portions as a document is being read;

prepares file information communicated from the scanner controller as document management information for the file manager, prepares page information communicated from the scanner controller as page management information for the file manager, creates, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image; and prepares a number of partitions and addresses communicated from the scanner controller and the partition descriptor as partition management information for the file manager, and prepares write-band address information communicated from the scanner controller as band information for the file manager.

12. A compound image-forming apparatus, comprising:

a main controller that partitions an original image into an arbitrary number of image partition portions as a document is being read; and creates, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image;

a file manager; and an output device that references document management information for the file manager, references page information as page management information for the file manager, references a number of partitions and addresses and the partition descriptor as partition management information for the file manager, references band address information as band information for the file manager, inputs the information to an image creation device, specifies an optimum compression format and resolution for the output device itself, and starts outputting.

13. A compound image-forming apparatus, comprising:

a main controller that partitions an original image into an arbitrary number of image partition portions as a document is being read; and creates, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image;

an image creation device;

an output device, which references document management information for a file manager, references page information as page management information for the file manager, references band address information as band information for the file manager, and requests the optimum compression format and resolution for the output device itself from a file system;

a file manager, which references the number of image partition portions and addresses and the partition descriptor as partition management information for the file manager itself; and a file system, which inputs page, partition and band information to the image creation device, inputs an optimum compression format and resolution specified by the output device to the image creation device, and starts outputting.

14. A compound image-forming apparatus, comprising:

a file manager;

a scanner controller;

an image creation device, which, based on an original image file ID delivered from the file manager, carries out a document opening process for the file manager, carries out a page opening process for the file manager, and prepares write band address information communicated from the scanner controller as band information for the file manager; and a main controller that partitions an original image into an arbitrary number of image partition portions as the document is being read; and creates, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image.

15. A compound image-forming apparatus, comprising:

a main controller that partitions an original image into an arbitrary number of image partition portions as a document is being read, and creates, before reading of the image is initiated, a partition descriptor that includes plural partition units corresponding to the image partition portions, each specific partition unit of the partition units including (i) an output destination address of the corresponding image partition portion, the output destination address indicating an address to which the corresponding image partition portion is to be outputted before the reading of the document is completed, and (ii) a next partition information address linked to a subsequent partition unit created in a same transaction as the specific partition unit, the subsequent partition unit corresponding to a subsequent image partition portion of the image, wherein the image partition portion corresponding to the specific partition unit and the subsequent image partition portion constitute different parts of the same image;

a scanner controller;

a file manager; and an image creation device, which, based on an original image file ID delivered from the file manager, carries out a document opening process for the file manager, carries out a page opening process for the file manager, creates thumbnail image information for the file manager, creates partition management information based on the partition descriptor for the file manager, and prepares write band address information communicated from the scanner controller as band information for the file manager.

* * * * *